United States Patent
Erickson et al.

(10) Patent No.: US 7,065,691 B2
(45) Date of Patent: Jun. 20, 2006

(54) APPARATUS AND METHOD FOR SAVING PRECISE SYSTEM STATE FOLLOWING EXCEPTIONS

(75) Inventors: Michael John Erickson, Loveland, CO (US); Paul John Mantey, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 415 days.

(21) Appl. No.: 10/440,890

(22) Filed: May 19, 2003

(65) Prior Publication Data
US 2004/0237011 A1    Nov. 25, 2004

(51) Int. Cl.
*G01R 31/28* (2006.01)
(52) U.S. Cl. .................... 714/727; 714/729
(58) Field of Classification Search ............ 714/39, 714/25, 10, 726, 727, 30, 729; 712/244, 712/227; 703/28
See application file for complete search history.

(56) References Cited

U.S. PATENT DOCUMENTS

| | | | | |
|---|---|---|---|---|
| 5,875,294 A * | 2/1999 | Roth et al. | ..................... | 714/39 |
| 5,909,574 A * | 6/1999 | Meyer | ......................... | 712/244 |
| 6,094,729 A * | 7/2000 | Mann | ........................... | 714/25 |
| 6,185,523 B1 * | 2/2001 | Itskin et al. | .................. | 703/28 |
| 6,446,221 B1 * | 9/2002 | Jaggar et al. | ................. | 714/30 |
| 6,829,701 B1 * | 12/2004 | Roth et al. | .................... | 712/227 |
| 6,886,111 B1 * | 4/2005 | Tran | ............................. | 714/38 |
| 6,898,731 B1 * | 5/2005 | Hack et al. | .................... | 714/10 |

* cited by examiner

Primary Examiner—David Ton

(57) ABSTRACT

A computer system has at least one processor, a memory system, a Joint Test Action Group (JTAG) bus interface, and Input/Ouput devices. At least one Input/Ouput device of the system has an integrated circuit connected to and readable by the JTAG bus interface. The memory system of the computer system contains an exception handler capable of reading a state of the readable integrated circuit of the Input/Output device upon occurrence of an exception.

7 Claims, 2 Drawing Sheets

APPARATUS AND METHOD FOR SAVING PRECISE SYSTEM STATE FOLLOWING EXCEPTIONS

FIELD OF THE APPLICATION

The application relates to the field of diagnosis of electronic systems, including computer systems. In particular, the application relates to methods and apparatus for saving system state information following an exception.

BACKGROUND

Jtag

The IEEE 1149.1 serial bus, also known as the Joint Test Action Group or JTAG bus, was devised for testing of inactive field replaceable units (FRUs) by providing access from a tester to circuitry within the FRU. In particular; the JTAG bus provided ability to perform a boundary scan on each integrated circuit on an FRU. The tester can verify connectivity of the integrated circuits of an FRU and verify that they are installed correctly. The JTAG bus provides for interconnection of one or more integrated circuits in a chain, any of which may be addressed by the tester. Typically, multiple devices of a circuit board are interconnected into a JTAG chain.

The JTAG bus uses four wires. These include a serial data-in line, a serial data-out line, a clock line, and a test mode select line. Typically the data-out line of a first chip in a chain couples in daisy-chain configuration to the data-in line of a second chip of the chain, and the data-out line of the second chip couples to the data-in line of a third; the data-out line of the last chip in the chain is brought back to the test connector.

The IEEE 1152 bus is a newer, enhanced, version of the 1149.1 JTAG bus. References herein to a JTAG bus are intended to include both the 1149.1 and 1152 variations.

The JTAG bus is most often used for testing FRUs in a factory environment, typically when these FRUs are inserted into FRU test apparatus for production testing. For purposes of this application, the term system excludes FRU test apparatus as used in production testing; the term system includes computer systems where FRUs operate to run operating system and user programs.

Exceptions

Modern digital systems are capable of detecting numerous types of errors, often known as exceptions. Many of these exceptions involve errors that occur as hardware, such as processor and input-output (I/O) device hardware, interacts with executing firmware or software. Exceptions range from simple errors to complex, difficult to debug, errors.

Typically, upon occurrence of an exception, processor state is saved and an exception-handler process is invoked. The exception handler process thereupon performs tasks that may include one or more of:

saving information about the exception to permit debug of exception causes,
reporting exception occurrence to system operators,
recovering from the exception cause, which may include retrying an operation, terminating and/or restarting specific processes triggering the exception, or rebooting the computer system.

Saving Information for Debugging

Exception causes are many and varied. Some exception causes are hardware related, many are firmware or software related. It is often desirable to analyze exception causes so that system reliability may be improved by reducing the rate of exceptions. Once causes are understood, appropriate repairs or design corrections may be made to system hardware, and revisions made to firmware and software. While many exceptions recur frequently under conditions that are readily duplicated in a laboratory where they can be analyzed, others may happen rarely. Yet other exceptions may happen only under field conditions. It is desirable to capture sufficient information about rare exceptions, or exceptions that happen only under field conditions, that underlying causes can be understood.

Exception handlers operating under the Unix or similar operating systems may save a "core" file upon occurrence of some exceptions. The "core" file contains detailed information about the state of processor registers and memory at the time an exception is detected. While a "core" file can be useful for debugging some exception causes, it lacks information about hardware state, especially complex I/O subsystem hardware, state, that may be of interest to an engineer analyzing an exception.

While I/O subsystem hardware may be fairly simple in some computer systems, I/O subsystem hardware can be quite complex in others. Control-oriented systems, such as are commonly embedded in radar systems, vehicles and aircraft, may have quite complex I/O hardware. The high-performance graphics integrated circuits now available for personal computers can also be quite complex.

SUMMARY

A computer system executes an operating system having an exception handler capable of saving hardware, as well as processor register and memory, state upon occurrence of selected exceptions. Hardware state is obtained by the exception handler through a JTAG interface upon occurrence of an exception, this information is obtained through scan chains built into system chipset and I/O device integrated circuits of the system.

In an embodiment, the hardware state saved by the exception handler includes boundary scan information obtained through the JTAG interface. In a second embodiment, the hardware state also information includes internal state information from selected integrated circuits of the system.

In yet another embodiment, an exception table is queried by the exception handler upon occurrence of an exception. The exception table is used by the exception handler to determine exceptions for which information should be saved, and for which of those exceptions hardware information should be saved.

In yet another embodiment, hardware state information is obtained by a management coprocessor through a JTAG interface; this hardware state information is passed to a primary processor and saved upon occurrence of an exception.

DETAILED DESCRIPTION OF THE EMBODIMENTS

Figure 1:
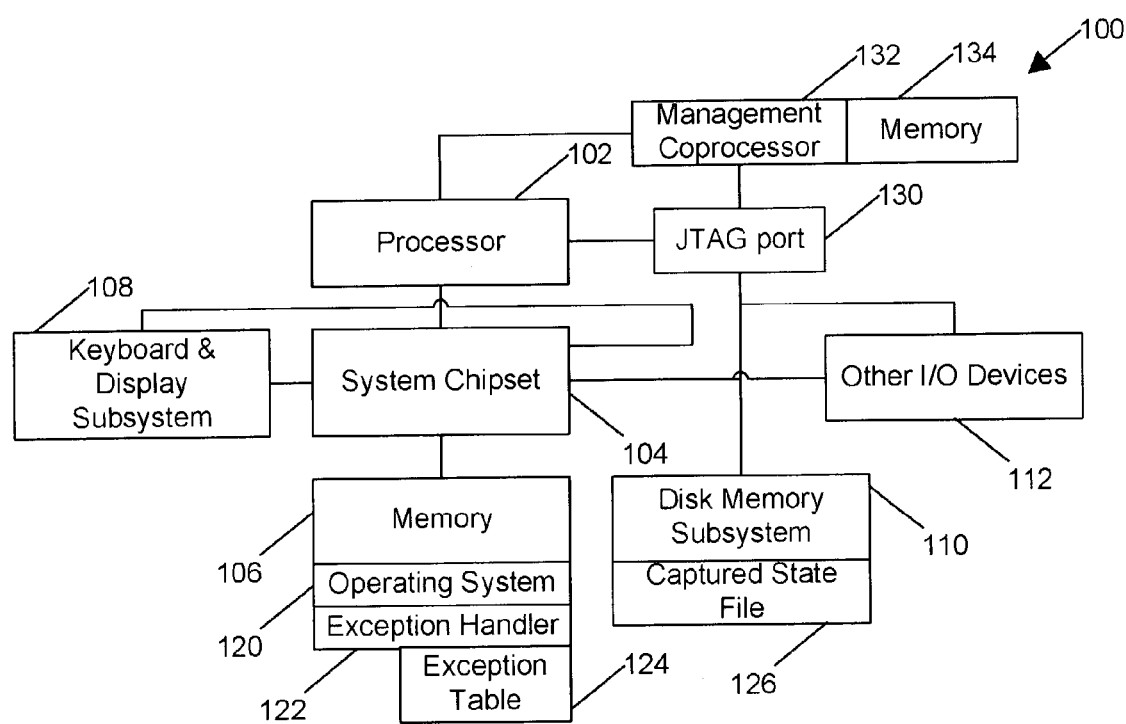
FIG. 1 is a block diagram of a computing system having at least one processor, system chipset, memory, disk memory system, a JTAG interface, and I/O devices.

A computer system 100 (FIG. 1) has at least one processor 102. Processor 102 connects through a system chip 104 to a memory system 106, a keyboard and display subsystem 108, a disk memory system 110 Input/Output (I/O) device, and other I/O devices 112. I/O devices 112 may include one or more of printer ports, serial ports, modems, network interface devices, CD and DVD reader and writer interfaces, and other peripherals as known in the art of computing devices.

In operation, the memory system 106 contains an operating system kernel 120, which has an exception handler 122. Exception handler 122 is invoked when the operating system detects an exception. The exception handler 122 includes an exception table 124 having information regarding desired processing of particular exceptions.

Exception table 124 allows an engineer or system manager to determine an appropriate response to each exception. In one embodiment, each exception has an exception type that serves as an index into the exception table 124. Exception table 124 has an exception action code that indicates how the exception handler should respond. The exception action code allows for, but is not limited to, the following possible actions:

ignore the exception,
recover from the exception, do not log it,
recover from the exception after logging the exception,
save expanded information in an exception log, then recover,
save expanded information in an exception log, save memory contents in a dump file, then recover and continue execution,
save expanded information in an exception log, save memory contents in a dump file and hardware state in a captured state file 126, then recover and continue execution, save expanded information in an exception log, save memory contents and hardware state in a captured state file 126, then stop for interactive debugging,
and in an alternative embodiment, save expanded information in an exception log, save memory contents in memory, save hardware state in memory 134 of a management processor 132, then stop for interactive debugging.

When an exception is encountered that is flagged in exception table 124 as one for which hardware state should be saved in a captured state file 126, hardware state information is obtained by processor 102 through a JTAG interface 130.

In an alternative embodiment, when an exception occurs that is flagged in exception table 124 as one for which hardware state should be saved in a captured state file 126 of a management coprocessor 132, hardware state information is obtained by management coprocessor 132 through a JTAG interface 130 and stored in memory 134. In this embodiment, when an exception occurs that is flagged in exception table 124 as one for which hardware state should be saved in memory 134 of a management coprocessor 132, hardware state information is obtained by management coprocessor 132 through a JTAG interface 130 and stored in memory 134.

Figure 2:
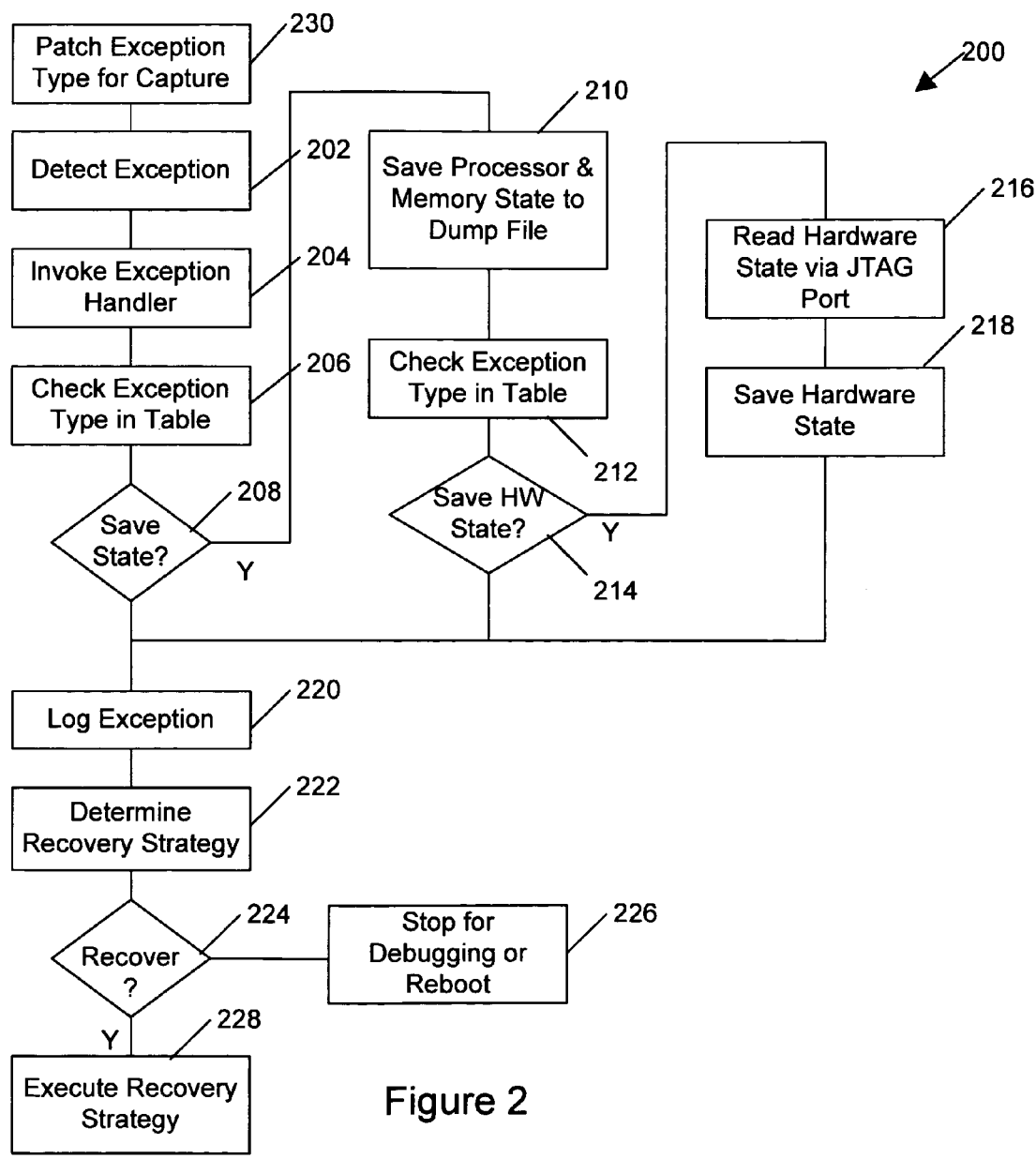
FIG. 2 is a flowchart of an exception handler such as may be used with the computer system of FIG. 1.

FIG. 2 is an exemplary flowchart of a method such as may be used with the computer system of FIG. 1. The method 200 begins with detection 202 of the exception and invocation 204 of an exception handler. Each exception is checked 206 in the exception table 124 to determine whether saving of I/O and system-chipset hardware state is desired. If 208 saving of processor registers and memory state is desired for the exception, processor registers and memory state are saved 210 in a dump file.

Next, the exception is checked 212 to determine whether saving of hardware state is also desired. If 214 saving of hardware state is desired, hardware state information is read 216 by a processor (either the management processor 132 or primary processor 102, depending the hardware embodiment), through JTAG port 130. The hardware state information is saved 218 in memory system 134 or as a captured state file 126 on disk memory system 110.

Most exceptions are then logged 220 and a recovery strategy is determined 222. If 224 no recovery is possible, the system may stop 226 for manual debugging or a system reboot. If 224 recovery is possible, the exception handler will then execute 228 the determined recovery strategy and permit system operation to continue.

In one embodiment, the exception handler 122 heretofore described is implemented as a portion of an operating system executing on the computer system 100. This embodiment is of particular utility in allowing manufacturers to diagnose rarely occurring faults related to hardware-firmware-software interactions in systems owned by customers of a computer manufacturer that are not easily duplicated in the manufacturer's laboratory. In this embodiment, the exception table 124 has default for an exception related to a rarely occurring fault of not capturing hardware state. When the fault occurs in a customer's system, the exception type for that exception is patched 230 in the exception table 124 to a value that indicates capture of hardware state. After the next occurrence of the exception, the saved hardware state is transmitted to the computer manufacturer and analyzed by employees of the computer manufacturer to determine root cause of the faults.

In an alternative embodiment, computer system 100 comprises one or more additional processors 140.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. A computer system having memory, the memory containing code for an exception handler, is a computer program product; similarly a disk memory having recorded on it code for an exception handler is a computer program product.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow:

What is claimed is:

1. A method of diagnosing faults related to hardware-firmware-software interactions in computer systems comprising the steps of:
    setting an exception action code in an exception table of a user-owned system to request capture of hardware state information upon occurrence of a specific exception;
    detecting the exception;
    invoking an exception handler in response to detecting the exception; checking an exception table to determine a response to the exception;

using a Joint Test Action Group interface to read hardware state from at least one integrated circuit of the user-owned system; and saving the hardware state in a captured state file.

2. The method of claim 1, further comprising saving processor state in a file.

3. The method of claim 1, wherein the at least one integrated circuit includes an integrated circuit of a system chipset.

4. The method of claim 1, wherein the computer system is owned by a customer of a computer manufacturer, and further comprising the steps of:

patching the exception type to enable capture of hardware state; and transmitting the captured hardware state to the computer manufacturer.

5. A method of exception handling in a computer system comprising the steps of:

detecting the exception;

invoking an exception handler;

using a Joint Test Action Group interface to read hardware state from at least one integrated circuit of the user-owned system;

saving the hardware state in a captured state file.

6. A computer system comprising:

at least one processor;

a memory system coupled to the processor, wherein the memory system contains an exception handler capable of reading a state of the readable integrated circuit of the Input/Output device upon occurrence of an exception;

a Joint Test Action Group (JTAG) bus interface; and at least one Input/Ouput device having at least one readable integrated circuit addressable by the JTAG bus interface;

a system chipset coupled to the processor and readable by the JTAG bus interface, wherein the exception handler is capable of triggering a management coprocessor to read hardware state information from the system chipset.

7. A computer system comprising:

at least one processor;

a memory system coupled to the processor;

a Joint Test Action Group (JTAG) bus interface; and at least one Input/Ouput device having at least one readable integrated circuit addressable by the JTAG bus interface;

wherein the memory system contains an exception handler capable of reading a state of the readable integrated circuit of the Input/Output device upon occurrence of an exception; and wherein the exception handler further comprises an exception table containing exception action codes, and wherein at least one action code of the exception table specifies saving of hardware state information in a captured state file.

* * * * *

UNITED STATES PATENT AND TRADEMARK OFFICE
CERTIFICATE OF CORRECTION

| | | |
|---|---|---|
| PATENT NO. | : 7,065,691 B2 | Page 1 of 1 |
| APPLICATION NO. | : 10/440890 | |
| DATED | : June 20, 2006 | |
| INVENTOR(S) | : Michael John Erickson et al. | |

It is certified that error appears in the above-identified patent and that said Letters Patent is hereby corrected as shown below:

In column 6, line 2, in Claim 6, delete "Input/Ouput" and insert
-- Input/Output --, therefor.

In column 6, line 16, in Claim 7, delete "Input/Ouput" and insert
-- Input/Output --, therefor.

Signed and Sealed this

Tenth Day of March, 2009

JOHN DOLL
*Acting Director of the United States Patent and Trademark Office*